US005468557A

United States Patent [19]

Nishio et al.

[11] Patent Number: 5,468,557

[45] Date of Patent: Nov. 21, 1995

[54] CERAMIC INSULATED ELECTRICAL CONDUCTOR WIRE AND METHOD FOR MANUFACTURING SUCH A WIRE

[75] Inventors: Masanobu Nishio; Kazuo Sawada; Shinji Inazawa; Kouichi Yamada, all of Osaka, Japan

[73] Assignee: Sumitomo Electric Industries, Ltd., Osaka, Japan

[21] Appl. No.: 19,135

[22] Filed: Feb. 18, 1993

Related U.S. Application Data

[63] Continuation-in-part of Ser. No. 464,447, Jan. 12, 1990, abandoned.

[30] Foreign Application Priority Data

Jan. 12, 1989 [JP] Japan .......................................... 1-5676

[51] Int. Cl.$^6$ ............................... B32B 9/00; B32B 15/04

[52] U.S. Cl. .......................... 428/384; 428/379; 428/380; 428/389; 428/368; 174/120 R; 174/110 A; 174/110 R

[58] Field of Search ..................................... 428/379, 389, 428/368, 381, 384, 387, 380; 174/°SR, 110 A, 110 R, 126.2

[56] References Cited

U.S. PATENT DOCUMENTS 1,727,550 9/1929 Legg .
2,336,219 12/1943 Brown ................................ 174/120 SR
2,947,069 8/1960 Carlson et al. ............................ 29/197
3,222,219 12/1965 Saunders et al. ........................ 428/384
4,423,119 12/1983 Brown et al. ............................ 428/558
4,585,696 4/1986 Dustmann et al. ...................... 428/375
5,091,609 2/1992 Sawada et al. ...................... 174/110 A

*Primary Examiner*—Patrick J. Ryan
*Assistant Examiner*—J. M. Gray
*Attorney, Agent, or Firm*—W. G. Fasse; W. F. Fasse

[57] ABSTRACT

A ceramic insulated wire has a conductor core of copper or copper alloy, a stainless steel layer around the conductor core and a chromium oxide film (2A) around the stainless steel layer. The chromium oxide film (2A) is surrounded by an outer ceramic insulator formed by a vapor deposition method. Cladding the conductor core with stainless steel is done by inserting the core lengthwise into a stainless steel pipe, plastically working the resulting composite body to provide a desired size, and oxidizing the stainless steel which contains sufficient chromium for the formation of the chromium oxide film to have a thickness within the range of 10 nm to 1000 nm. The outer ceramic insulator formed by vapor deposition is made of $Al_2O_3$, $SiO_2$, AlN and $Si_3N_4$ which provide an excellent heat resistance while the chromium oxide film substantially increases the bonding strength.

8 Claims, 2 Drawing Sheets

CERAMIC INSULATED ELECTRICAL CONDUCTOR WIRE AND METHOD FOR MANUFACTURING SUCH A WIRE

CROSS-REFERENCE TO RELATED APPLICATION

This application is a continuation-in-part application of our application U.S. Ser. No. 07/464,447; filed on Jan. 12, 1990, now abandoned.

FIELD OF THE INVENTION

The present invention relates to ceramic insulated electrical conductor wires used, for example, in vacuum devices, on combustion engines, and the like where such wires are exposed to high operating temperatures. The present invention further relates to a method of manufacturing such ceramic insulated electrical conductor wires.

BACKGROUND INFORMATION

Bare uninsulated electric wires passing through ceramic bead insulators and electric wires having an oxide film formed by anodization or electrophoretic deposition around a conductor mainly formed of aluminum, have been known as insulated electric wires used in vacuum devices and in other high operating temperatures devices.

However, manufacturing of such insulated electric wires which are made by passing bare copper wires through ceramic bead insulators, takes much time and labor, since the bare copper wire must be passed through ceramic bead insulators one by one.

By anodization or electrophoretic deposition, oxide films could be formed only around conductors mainly formed of aluminum. The insulated electric wires manufactured by such method have a rough surface and many voids in the insulating outer films. Hence, when such insulated electric wires were used in vacuum devices, it took much time to evacuate the vacuum devices, because of gases such as air adsorbed at the surface of the voids. Further, the reduced pressure was not low enough due to slow leak problems. As a result, the attained vacuum was not high enough for many purposes.

Electric wires coated by resin including fluorine such as tetrafluoroethylene are used where high heat resistance is not very important. These wires are not suitable for high operating temperatures.

Vacuum devices requiring a high vacuum are subjected to degassing by a baking process, so as to improve the evacuation efficiency.

However, when electric wires coated with a resin including fluorine, are used at a temperature of at least 260° C., the resin is decomposed, generating gas and lowering the vacuum and the dielectric breakdown voltage. Therefore, the use of such electric wires is limited to applications not requiring a high heat resistance.

U.S. Pat. No. 3,222,219 (Saunders et al.), issued on Dec. 7, 1965, discloses a ceramic coated electrically conductive wire and method for making such a wire in which a good adhesion of the ceramic coating to the metal substrate is obtained by the solution of the metal oxide, formed in the initial stages of curing, by the glassy phase, to form a saturated interfacial layer of this metal oxide in the glassy phase at the metal ceramic interface. The glassy phase at the metal ceramic interface is part of the coating which also includes a crystalline phase. This combination of a glassy phase with a crystalline phase in the coating provides a good flexibility and contributes to the bonding between the oxidation resistant conductor and the ceramic coating. While chromium oxide may be contained in the glassy phase, it does not exhibit its inherent nature in this type of glassy phase forming part of the ceramic insulating coating. Such a structure does not suggest the intentional formation of a chromium oxide layer on the oxidation resistant conductor core as taught by the present invention. A re-melting temperature of the glassy phase in the ceramic coating is about 700°–800° C. Accordingly, the ceramic coated conductor wire disclosed in U.S. Pat. No. 3,222,219 may not be used at a high temperature above 700° C.

If a ceramic insulator directly formed on the conductor core is mainly formed of copper by vapor deposition, the conductor core is not sufficiently bonded to the ceramic insulator, since the affinity between the copper and the ceramic insulator is low. The invention wants to avoid this problem.

SUMMARY OF THE INVENTION

Therefore, it is one object of the present invention to provide a ceramic insulated electrical conductor wire having a superior heat resistance, no voids nor any unevenness in the surface of its insulating film, and which can be manufactured easily.

Another object of the present invention is to provide a method for manufacturing a ceramic insulated wire as just described.

The ceramic insulated wire in accordance with the present invention comprises an electrical conductor core formed of copper or a copper alloy, a stainless steel layer provided around the conductor core, a chromium oxide layer having a thickness in the range from 10 nm to 1000 nm on the stainless steel layer and a ceramic insulator on said chromium oxide layer bonded to said stainless steel layer through said chromium oxide layer. The stainless steel layer and the chromium oxide layer neutralize and thereby prevent any effects of a low affinity between the copper conductor and the ceramic insulator, whereby the bonding strength is improved to secure the outer ceramic insulator to the copper conductor through the chromium oxide layer and the stainless steel layer.

The method of manufacturing the ceramic insulated wire in accordance with the present invention comprises the steps of covering said copper core conductor with a stainless steel coating containing chromium sufficient for forming a chromium oxide layer on said stainless steel coating, oxidizing the stainless steel coating covering the copper conductor core, at a temperature in the range of 200° C. to 620° C. in the presence of a partial pressure of oxygen not higher than 200 Torr, to form said chromium oxide layer on the surface of the stainless steel coating, and then forming a ceramic insulator on the chromium oxide layer by vapor deposition.

The ceramic insulated wire in accordance with the present invention has, on the copper core, a stainless steel layer covered on its radially outer surface with a chromium oxide layer bonded to the outer ceramic insulator. The chromium oxide coating on the stainless steel has a stabilizing passivation function which assures an excellent bonding of the outer ceramic insulation layer to the conductor wire by preventing adverse low affinity effects between the copper conductor and the ceramic insulation. Provided the chromium oxide layer has the above thickness of 10 to 1000 nm, bonding strengths within the range of 180 $kgf/mm^2$ to 200

$kgf/mm^2$ have been achieved, whereby the chromium oxide film is firmly bonded to the outer ceramic insulator and to the stainless steel layer which is thus firmly in contact with the outer ceramic insulator. These features also improve the flexibility of the ceramic insulated wire. The stainless steel used according to the invention includes austenitic stainless steels such as SUS 304, SUS 316, ferritic stainless steel such as SUS 430, and martensitic stainless steel such as SUS 410. The reference characters SUS 304, SUS 316, SUS 430 and SUS 410 are types of stainless steels defined by Japanese Industrial Standard (JIS).

Preferably, the stainless steel layer has a first cross-sectional area. The copper conductor and the stainless steel layer together have a second cross-sectional area. The ratio between the first and second cross-sectional areas is within the range of 5 to 70%. If the ratio is less than 5%, the surface of the conductor portion may not be covered uniformly with the stainless steel layer. If the ratio exceeds 70%, the conductivity of the ceramic insulated wire itself is reduced, since the stainless steel has a low conductivity.

According to the invention, the present ceramic-insulated wire having a copper core conductor and a stainless steel layer around the copper core conductor and a ceramic insulator, is produced by the following steps. First, the stainless steel layer is formed around the copper conductor by cladding. Second, a chromium oxide layer is formed on the stainless steel layer. Third, the ceramic insulator is formed around the chromium oxide layer by vapor deposition.

To perform the cladding, preferably, the copper core conductor is inserted lengthwise into a stainless steel tube to form a composite body which is then subjected to plastic working such as forging or stamping, wire drawing and the like to reduce the initial outer diameter of the composite body down to a practically useful size, depending on the use for which the present wires are intended.

It is an advantage of the present invention, that the outer ceramic insulator is stable even at a high temperature, whereby the ceramic insulated wire of the present invention does not generate gas derived from the decomposition of the insulator even when it is used at a high operating temperature, e.g. in an engine compartment, in a vacuum device and the like. Further, the invention prevents lowering the dielectric breakdown voltage even at these high operating temperatures. The term high temperature here means a temperature not lower than 300° C. and up to 1000° C., near the melting point of copper.

Therefore, the ceramic insulated wire in accordance with the present invention can be used in vacuum devices which require a high heat resistance for the wiring used therein.

$Al_2O_3$, $SiO_2$ and $Si_3N_4$, and AlN for example, are members of a group known as ceramics that are preferably used for the purpose of the present invention because these ceramics are superior both in their insulating quality and heat resistance.

The outer ceramic insulator film on the ceramic insulated wire of the invention is formed by vapor deposition. Any of the following types of vapor deposition are suitable for the present purposes, namely chemical vapor deposition, plasma enhanced chemical vapor deposition, ion plating, sputtering, vacuum deposition, and cluster ion beam deposition. These depositions of the ceramic insulator on the chromium oxide film of the stainless steel are flat with a smooth surface and with a uniform thickness of the ceramic insulator throughout its extent. Such an even or smooth surface of the ceramic insulator without any voids in which air could be contained is an important advantage because it does not take a long time to pump down a vacuum device in which the present conductors are used.

Preferably, the thickness of the ceramic insulator film on the ceramic insulated wire of the present invention, is in the range of 2 μm to 10 μm. If the film is thinner than 2 μm, the dielectric breakdown voltage is too low. If the film thickness exceeds 10 μm, cracks may possibly occur in the insulator film causing peeling of the insulator film.

Forming the ceramic insulator film on the wire of the present invention by vapor deposition has yet another advantage due to the fact that the handling of the vapor deposition is easier compared with the conventional operation of passing bare copper wires through beads formed as ceramic insulators.

DESCRIPTION OF THE PREFERRED EMBODIMENTS

Embodiment 1

Figure 1:
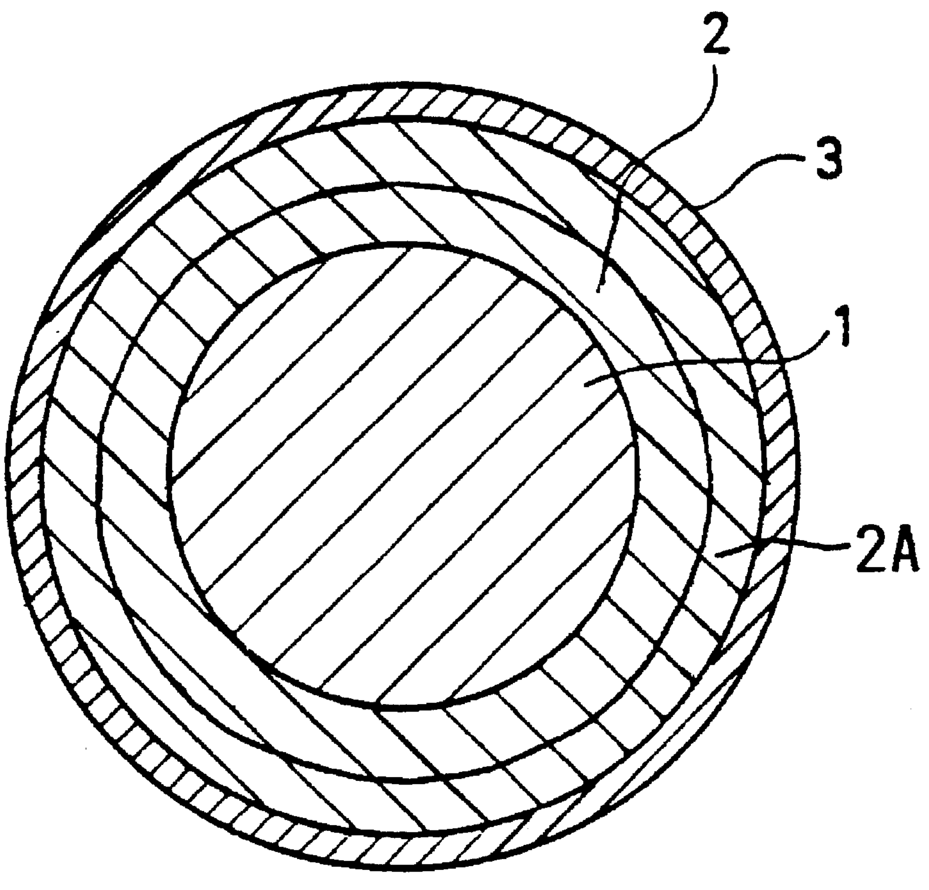
FIG. 1 is a cross-sectional view of one embodiment of the ceramic insulated wire in accordance with the present invention.

One embodiment of the ceramic insulated wire in accordance with the present invention shown in FIG. 1 is manufactured in the following manner.

A stainless steel layer 2 is provided on the copper or copper alloy wire core 1 by a cladding method, to provide a composite wire body. The wire body has a diameter of 2 mm. The stainless steel layer 2 contains sufficient chromium, preferably within the range of 12 to 20% by weight of the stainless steel to form a film or coating 2A of chromium oxide ($Cr_{2-x}O_3$; x<0.077) on the surface of the steel cladding by oxidizing the stainless steel cladding under controlled oxidizing conditions at a temperature within the range of 200° C. to 600° C. and at an oxygen partial pressure of less than 200 Torr. Under these oxidizing conditions the chromium oxide film or coating 2A that is intentionally formed on the stainless steel surface, provides a passivation film 2A which greatly enhances the bonding of the ceramic electrical insulation outer layer to the stainless steel cladding and thus to the conductor core. Bonding strengths within the range of 180 $kgf/mm^2$ to 200 $kgf/mm^2$ have been achieved according to the invention. The oxidizing step is continued until the chromium oxide layer has a thickness within the range of about 10 nm to about 1000 nm. If the chromium content of the stainless steel is less than 12% wt., it is difficult to form a suitable chromium oxide layer. If the chromium content in the stainless steel is more than 20 % wt., the stainless steel layer becomes fragile.

Figure 2:
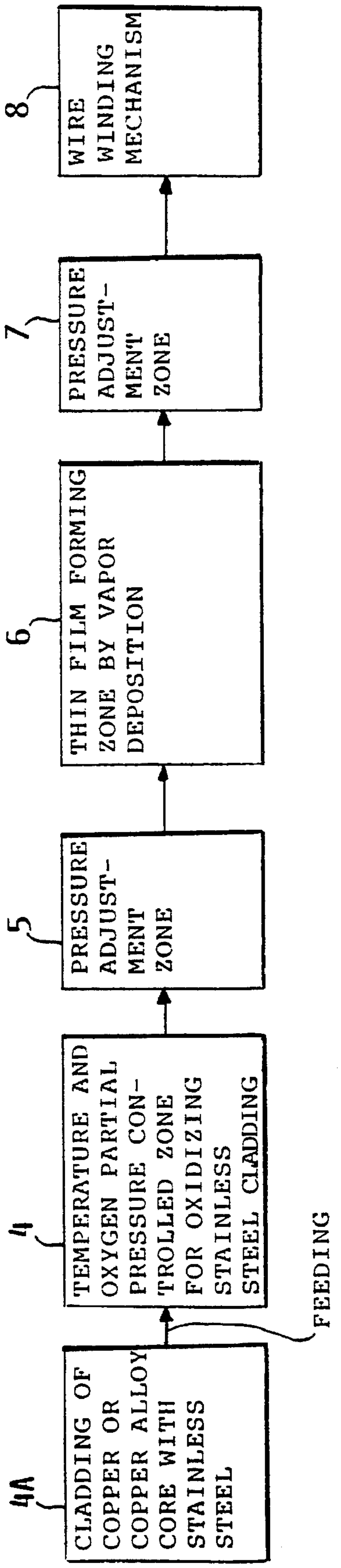
FIG. 2 shows the steps of forming an insulating film on the ceramic insulated wire of the present invention by using vapor deposition.

After completion of the oxidizing, a ceramic insulating layer 3 is formed on the chromium oxide film or coating 2A by vapor deposition. FIG. 2 shows the steps of oxidizing and forming the ceramic insulating film around the chromium oxide film of the wire vapor deposition.

As shown in FIG. 2, the wire is transported from station to station as indicated by the arrows. The wire passes from a cladding station 4A to an oxidizing station 4 and then to a pressure adjustment zone 5. Thereafter, the wire is transmitted from the pressure adjustment zone 5 to a thin film forming zone 6 where any of the above mentioned vapor depositions is performed, to produce the ceramic insulating film 3 on the chromium oxide or layer 2A of the wire.

Thereafter, the wire is transmitted from the thin film forming zone 6 to a pressure adjustment zone 7 and then to a winding mechanism 8.

The following Table 1 supports the above disclosed oxidizing conditions, the thickness of the chromium oxide film or coating 2A on the stainless steel cladding 2, and the bonding strength.

TABLE 1

| Conditions for Oxidizing Stainless Steel: Temperature | Conditions for Oxidizing Stainless Steel: Oxygen Partial Pressure | Thickness of Chromium Oxide Film | Adhesiveness Between Chromium Oxide Film And Ceramic Insulating Film |
|---|---|---|---|
| 1 100° C. | 10 Torr | 6 nm | 60 kgf/mm$^2$ |
| 2 200° C. | 150 Torr | 12 nm | 180 kgf/mm$^2$ |
| 3 400° C. | 10 Torr | 20 nm | 200 kgf/mm$^2$ |
| 4 600° C. | 1 Torr | 50 nm | 200 kgf/mm$^2$ |
| 5 620° C. | 1 Torr | 50 nm | 200 kgf/mm$^2$ |
| 6 600° C. | 250 Torr | 2000 nm | 15 kgf/mm$^2$ |
| 7 650° C. | 1 Torr | 4000 nm | 10 kgf/mm$^2$ |
| 8 Thickness of a Naturally Formed Chromium Oxide Film | | 5 nm | 50 kgf/mm$^2$ |
| 9 600° C. | 5 Torr | 200 nm | 200 kgf/mm$^2$ |
| 10 600° C. | 40 Torr | 1000 nm | 180 kgf/mm$^2$ |

As is apparent from Table 1, when the thickness of the chromium oxide film or coating is outside of the range from 10 nm to 1000 nm, the adhesiveness between the chromium oxide film 2A and the ceramic insulating layer 3 is remarkably degraded. If the thickness of the chromium oxide layer is larger than 1000 nm, cracks are generated in the chromium oxide film 2A. The crack portions do not contribute to adhesion between the chromium oxide film 2A and the ceramic insulating layer 3. Therefore, if the thickness of the chromium oxide layer exceeds 1000 nm, the adhesiveness or bonding strength is decreased.

A chromium oxide film may be naturally formed on the surface of stainless steel containing chromium. However, the thickness of the chromium oxide layer naturally formed is only about 5 nm and hence cannot provide any sufficient adhesiveness. The thickness of the chromium oxide layer cannot exceed about 5 nm unless the stainless steel is positively oxidized under the conditions taught by this invention.

By oxidizing the stainless steel layer, the chromium oxide layer is formed. As is apparent from the Table 1, the thickness of the chromium oxide layer depends on the temperature and the partial pressure of oxygen and on the time of exposure to the oxidizing condition. An exposure time within the range of 10 to 60 minutes has been found to be adequate. If the temperature is lower than 200° C., the thickness of the chromium oxide film tends to be smaller than 10 nm. If the temperature exceeds 620° C., the thickness of the chromium oxide film 2A becomes thicker than 1000 nm. If the partial pressure of oxygen is higher than 200 Torr, the thickness of the chromium oxide layer exceeds 1000 nm.

The ratio of the cross-sectional area of the stainless steel including the chromium oxide film or coating to the total cross-sectional area of the copper core and the stainless steel with its oxide coating is within the range of 5 to 70%, preferably within the range set forth below in Table 2 which also shows the methods of forming the insulator film 3, the ceramic insulator film material, and the insulator film thickness.

The following tests were made on the ceramic insulated wires formed as described above. Namely:

(1) Flexibility test. The ceramic insulated wires are wound around a bar having a diameter of 6 mm. Wires which as a result of this winding do not have any cracks nor peelings of the ceramic insulating film, received a "passing grade". The wires are inspected for cracks and peelings in the ceramic insulating film through a stereo microscope at a magnification of fifteen.

(2) Breakdown Voltage Test. This test is carried out in accordance with the metal-foil method of JIS C 3003 (Japanese Industrial Standards), and the dielectric breakdown voltages of these ceramic insulated wires are measured. The metal-foil method is a test for measuring the breakdown voltage by wrapping a conductor with a metal foil in tight contact and by applying an AC voltage between the conductor and the metal foil. The ceramic insulated wire was operated at 500° C. for 60 minutes and then, the breakdown voltage test was performed at room temperature.

(3) Heat test. The ceramic insulated wires were heated to 500° C. and maintained at this temperature for 60 minutes. Those wires exhibiting neither cracks nor any peeling of the ceramic insulating film and having no change in the dielectric breakdown voltage received a "passing grade".

Tests (1), (2) and (3) were also made on a conventional electric wire coated with resin including fluorine and on an electric wire on which the ceramic insulating film is directly formed around the copper wire, as examples for comparison, which are represented as No. 8 and No. 9, respectively, in Table 2.

TABLE 2

| No | Remarks | Stainless Steel Material | Ratio of Cross-Sectional Area of Stainless Steel to Total Cross-Sectional Area of Copper and Stainless Steel | Film Forming Method | Film Material | Film thickness (μm) of Ceramic Outer Insulator | Flexibility | Breakdown voltage (V) | Heat Resistance |
|---|---|---|---|---|---|---|---|---|---|
| 1 | Examples | SUS 304 | 36% | plasma CVD | $SiO_2$ | 3 | passed | 400 | passed |
| 2 | of the | SUS 316 | 28% | ion plating | $Al_2O_3$ | 4 | passed | 400 | passed |
| 3 | Present | SUS 430 | 44% | sputtering | $SiO_2$ | 3 | passed | 400 | passed |
| 4 | Invention | SUS 410 | 20% | plasm CVD | $Si_3N_4$ | 3 | passed | 400 | passed |
| 5 | | SUS 304 | 18% | ion plating | $Al_2O_3$ | 3 | passed | 400 | passed |

TABLE 2-continued

| No | Remarks | Stainless Steel Material | Ratio of Cross-Sectional Area of Stainless Steel to Total Cross-Sectional Area of Copper and Stainless Steel | Film Forming Method | Film Material | Film thickness (μm) of Ceramic Outer Insulator | Flexibility | Breakdown voltage (V) | Heat Resistance |
|---|---|---|---|---|---|---|---|---|---|
| 6 | | SUS 316 | 36% | sputtering | $Al_2O_3$ | 5 | passed | 400 | passed |
| 7 | | SUS 304 | 20% | plasm CVD | $SiO_2$ | 5 | passed | 500 | passed |
| 8 | Prior Art | — | — | — | Resin Including Fluorine | 200 | passed | 1500 | failed |
| 9 | For Comparison | — | — | plasma CVD | $SiO_2$ | | Immeasurable: No Film is Formed | | |
| 10 | Examples of the Present Invention | SUS 304 | 38% | ion plating | AlN | 5 | passed | 400 | passed |

As shown in Table 2, the insulated electric wires No. 1 to No. 7 and No. 10, which are the embodiments of the present invention, have passed the flexibility test and the heat test.

The wire coated with resin including fluorine, which is a prior art example represented as No. 8, passed the flexibility test but failed in the heat test.

The wire No. 9 on which the ceramic insulating film is directly formed around the copper wire, which is an example for comparison, could not be subjected to the flexibility test and the heat test, since no film could be formed as the ceramic was easily peeled off from the conductor portion.

In view of the foregoing, the ceramic insulating wires of the present invention are superior in flexibility and in heat resistance.

Therefore, when the ceramic insulated wires of the present invention are used as electric wires in vacuum devices, the vacuum devices may be heated to a high temperature. Consequently, the pressure of the vacuum devices can be decreased. In addition, the ceramic insulated wires can be used where flexibility is required.

The ceramic insulated wires No. 1 to No. 7 and No. 10 which are the embodiments of the present invention, have dielectric breakdown voltages not lower than 400 V. Therefore, the ceramic insulated wires of the present invention have preferable dielectric breakdown voltages required for insulated electric wires intended for use under high operating temperatures.

Embodiment 2

An electric wire as long as 20 m is placed in a vacuum chamber, and the time required for pumping down to the vacuum of $10^{-5}$ Torr was measured, for each of the insulated electric wires No. 1 to No. 7 of the present invention.

The time for pumping down was 1 hour and 25 minutes for each of the insulated wires No. 1 to No. 7 of the present invention positioned in the vacuum chamber, and there was no significant difference in the pumping down time in comparison with the condition in which there is no insulated wire in the vacuum chamber. Thus, the time of pumping down can be reduced compared to conventional vacuum systems, wherein conventionally coated electric wires are used.

The above mentioned austenitic stainless steels SUS 304 and SUS 316, ferritic stainless steel SUS 430, and martensitic stainless steel SUS 410 are taken from Japanese Industrial Standards JIS G4303-1991.

Although the present invention has been described with reference to specific example embodiments, it will be appreciated that it is intended to cover all modifications and equivalents within the scope of the appended claims.

What we claim is:

1. A ceramic insulated electrical conductor wire comprising a copper conductor, a stainless steel layer surrounding said copper conductor, a distinct chromium oxide layer having a thickness in the range from 10 nm to 1000 nm formed on said stainless steel layer, and a vapor deposition ceramic insulator bonded by said chromium oxide layer to said stainless steel layer, said stainless steel layer and said chromium oxide layer together isolating said copper conductor from adversely influencing said vapor deposition ceramic insulator for an improved bonding strength between said stainless steel layer and said ceramic insulator and thus between said vapor deposition ceramic insulator and said copper conductor.

2. The ceramic insulated wire of claim 1, wherein said stainless steel layer contains chromium in the range from 12 to 20 percent by weight of said stainless steel layer for forming said chromium oxide.

3. The ceramic insulated wire of claim 1, wherein said stainless steel layer has a first cross-sectional area, wherein said copper conductor and said stainless steel layer together have a second cross-sectional area, and wherein a ratio of said first cross-sectional area to said second cross-sectional area is in the range of 5 to 70%.

4. The ceramic insulated wire of claim 1, wherein said stainless steel layer is made of at least one steel selected from the group consisting of austenitic stainless steel, ferritic stainless steel, and martensitic stainless steel.

5. The ceramic insulated wire of claim 1, wherein said vapor deposition ceramic insulator is a coating having a thickness in the range of 2 to 10 μm.

6. The ceramic insulated wire of claim 1, wherein said vapor deposition ceramic insulator is formed of at least one member selected from the group consisting of $Al_2O_3$, $SiO_2$, AlN and $Si_3N_4$.

7. The ceramic insulated wire of claim 1, wherein said bonding strength is within the range of about 180 $kgf/mm^2$ to about 200 $kgf/mm^2$.

8. The ceramic insulated wire of claim 1, wherein said stainless steel layer and said chromium oxide layer together have a first cross-sectional area, wherein said copper conductor, said stainless steel layer, and said chromium oxide layer together have a second cross-sectional area, and wherein the ratio between said first cross-sectional area and said second cross-sectional area is within the range of 5 to 70%.

* * * * *